July 27, 1965
J. L. ZAMBROW
3,197,382
INTERNALLY STRENGTHENED FLAT FUEL PLATE
Filed Aug. 11, 1960
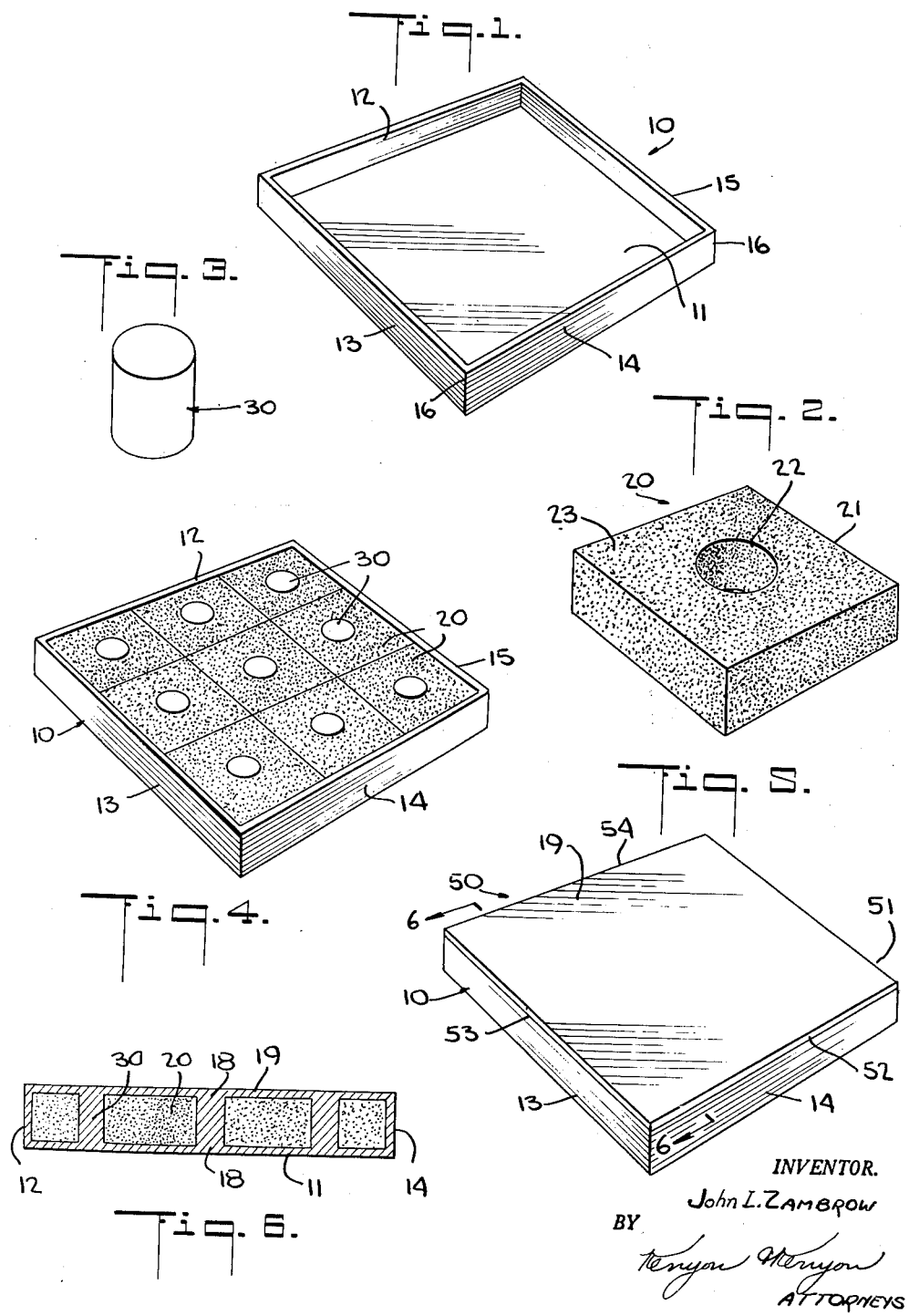
INVENTOR.
John L. Zambrow
BY
Kenyon & Kenyon
ATTORNEYS 3,197,382
INTERNALLY STRENGTHENED FLAT
FUEL PLATE
John L. Zambrow, Westbury, N.Y., assignor, by mesne assignments, to Sylvania Electric Products Inc., a corporation of Delaware
Filed Aug. 11, 1960, Ser. No. 48,971
5 Claims. (Cl. 176—73)

This invention relates to flat nuclear fuel assemblies and more particularly to methods for fabricating and cladding ceramic core fuel plates.

As is well known in the art, fuel elements comprising fissionable material must be clad with metallic casing, to protect said elements from erosion by the circulating heat transfer medium. For improved thermal conductivity, the metallic casing should closely comprehend the enclosed fissionable material.

At present, fuel elements are most commonly tubular in shape and are bound mechanically to their surrounding cylindrical casings. This tubular geometry is not the most efficient for maximum heat transfer, and high central fuel element temperatures result.

Another disadvantage of such fuel elements is that the mechanical bond results in poor thermal conductivity. Also, gaseous fission by-products distort the metallic casing and separate the casing from the fissionable material, further reducing thermal conductivity, and limiting operational temperatures.

The art has long been in need of a flat fuel plate which would avoid the aforesaid disadvantages of tubular fuel elements and which would take advantage of the geometric superiority of plates over tubes as heat transfer structures.

However, the prime disadvantage of flat fuel plates heretofore has been the inability to metallurgically bond the cladding metal to the internal ceramic fuel. This has resulted in the bulging away of the cladding metal from the fuel core when fission gas pressure built up during burnup, thus preventing further efficient heat transfer from the ceramic core to the metallic cladding. Since the high heat transferability inherent in plate configurations was being thwarted by this separation problem, the higher burnups and efficiencies that flat plate designs promised were not being attained.

The primary object of this invention is to provide a method for fabrication of flat, metal-clad ceramic core fuel plates which will permit higher operating temperatures, longer burnups and improved power densities.

Another object is to provide a fuel element of improved structural design which will better resist the internal pressures due to gaseous fission products, thus permitting longer burnup and improved thermal conductivity.

It is a further object to provide a fuel element of improved geometry which will result in more efficient heat transfer.

These and further objects will become more apparent as the device and method are hereafter described in greater particularity.

Briefly stated, the invention contemplates the manufacture of flat nuclear fuel plates by the fabrication of a multiplicity of regular shaped flat $UO_2$ ceramic slabs with holes, assembly of the slabs in a shallow sheet metal box, insertion of metal dowels into the holes in the squares, covering of the assembly with a metal sheet, hermetically sealing the edges, as for example, by seal welding in vacuum and hot isostatically pressing or rolling the entire assembly. Thus, the metal dowels located within the slabs of $UO_2$ are metallurgically bonded to both the top and bottom plates and act as structural columns affording strength normally not available against the internal pressure created by gaseous fission products.

In the drawings:

FIG. 1 is a perspective view of a metallic casing within which the fuel slabs are to be assembled.

FIG. 2 is a perspective view of one form of an individual fuel slab with a hole in the middle.

FIG. 3 shows a typical metal dowel.

FIG. 4 is a perspective view of the fuel slabs of the type shown in FIG. 2 assembled within the metallic casing of FIG. 1, and with metallic dowels inserted into the holes of the individual fuel slabs.

FIG. 5 is a perspective view of the completed fuel plate assembly, after sealing of the assembly shown in FIG. 3, and hot pressing of the assembly joining the upper and lower metallic faces with the dowels.

FIG. 6 is a section view of the completed fuel plate of FIG. 5 taken through a row of dowels along line 6—6 therein, and showing the integral nature of the metal cladding and dowels.

Referring to the drawings, the invention comprises in general a metal tray 10 into which are assembled a plurality of fuel slabs 20 and dowels 30 therein. A cover plate 19 is affixed and sealed to constitute the final assembly 50 as is hereafter described.

Tray 10 is formed of nuclear cladding material such as stainless steel or aluminum for example. The tray may be machined to shape or may preferably be formed from sheet stock. When formed from sheet stock the sides 12, 13, 14 and 15 are turned up from bottom member 11 and sealed metallurgically, as for example by welding, at the four corners 16. The sides 12, 13, 14 and 15 should preferably be slightly greater in inside height than the thickness of fuel slabs 20, as hereinafter explained.

Fuel slab 20 may be formed in any shape designed to allow a plurality of such fuel slabs to be arranged to form a coplanar contiguous fuel arrangement. Polygonal regular shapes are generally preferred, and square or rectangular shapes are most practical. Depicted in FIG. 2 is the preferred rectangular or square embodiment, showing the compressed ceramic fuel 21 and a hole 22 passing normally to the major faces 23 completely through the fuel slab 20. The slabs are formed by compression techniques well known in the art. While any ceramic fuel may be so prepared, it is contemplated to employ $UO_2$.

Dowel 30 is preferably a right cylinder to match hole 22 in fuel slab 20. However, it is to be understood that dowel 30 and hole 22 could be of any matching outline, the only requirement being that dowel 30 be of sufficient length to completely fill hole 22 with a slight overhang, approximately equal to the excess of the inside height of tray 10 over fuel slabs 20 as heretofore mentioned.

It is to be understood that dowels 30 may be welded or otherwise affixed directly to the bottom of tray 10, that is at bottom member 11, however it is preferred to assemble tray 10 with fuel slabs 20 first and then affix dowels 30, as hereafter described. For purposes of metallurgical bonding, dowel 30 should be of similar material to tray 10 and cover 19.

Tray 10 and fuel slabs 20 are designed to have dimensions forming integral multiples of each other so that a close fitting relation may be attained. In the illustration of FIG. 4, nine fuel slabs 20 have been arranged in a tray 10, but it is understood that any number of suitable sized slabs may be fitted into a suitable sized tray cooperatively. It is also contemplated to employ one large ceramic fuel slab with one or more dowels therethrough, but multiple smaller slabs are preferred for reasons of manufacturing economy.

When fuel slabs 20 have been assembled in tray 10, dowels 30 are inserted into each hole 22 in each fuel slab. It will be recalled that dowels 30 and tray sides 12, 13, 14 and 15 all preferably project slightly over fuel slabs 20 when assembled as in FIG. 4.

A cover plate 19, of metal similar to that forming tray 10 is then metallurgically bonded along seams 51, 52, 53 and 54. Welding is preferred, and if employed, should be done in an oxygen free atmosphere. Thus, if high heating is to be employed to seal seams 51, 52, 53 and 54 as in the case in all metallurgical bonding techniques including welding, there is danger that fuel slabs 20 will be oxidized and damaged. Stoichiometric $UO_2$ is preferred as a fuel, and the exclusion of oxygen in such a heat sealing process will prevent oxidizing $UO_2$ to a less desirable form. Vacuum or inert gas may be employed as an environment.

After sealing of cover 19 onto the tray and doweled slabs assembly, the dowels must be bonded to both the bottom member 11 of tray 10 and to cover member 19. This may be accomplished by several techniques. Preferably the entire assembly 50 is hot isostatically pressed at 1200° C. and 14,000 p.s.i. for 1 hour, for example, so that sides 12, 13, 14 and 15 and dowels 30 are all compressed down to the height of fuel slabs 20. During such a hot compression process dowels 30 will metallurgically bond to tray bottom 11 and cover plate 19. The isostatic conditions mentioned are the maximum desirable. Stainless steel parts are preferred but other metals may be used. Thus lower isostatic pressing conditions within the maximum mentioned may be employed depending on the material, if desired. Hot rolling may achieve a similar result, but it has been found that there is danger of cracking of the $UO_2$ slabs, so that hot isostatic pressing is much preferred. Hot isostatic pressure is well-known in the art, and contemplates in general the compression from all sides by a superheated atmosphere.

An alternative method of manufacture is to tailor sides 12, 13, 14 and 15 and dowels 30 to match the height of fuel slabs 20, and to assemble them as above described, but to attain metallurgical bonding between the dowels 30 and tray bottom 11 and cover 19 by spot welding. Since the positions of dowels 30 are regular, spot welding of each dowel is easily accomplished by spotting both ends at once from outside assembly 50.

When the metallurgical bonding is accomplished by any of the methods described above, the product is a fuel plate that has metallurgical continuity from cover 19 to tray bottom 11 through bonds 18 and dowels 30. This metallurgical continuity prevents buckling of cover 19 or bottom 11 due to fission gas pressure and attendant loss of heat transfer contact, and also assures more heat flow from the fuel core, because dowels 30 are immersed in the central hot portion and yet metallurgically communicate with outer surfaces 11 and 19 which carry heat away to the surrounding heat transfer medium (not shown).

It will be apparent to those skilled in the art that variations in method, materials, and specific number and arrangement of parts may be practiced and that the teaching herein is by way of example only, and consequently the only limitations are in the appended claims.

What is claimed is:

1. A nuclear fuel plate comprising a plurality of contiguous coplanar fuel slabs having a thickness equal to a major fraction of the thickness of said fuel plate, said plurality of fuel slabs being distributed throughout the area of the fuel plate, each of said slabs having means defining a hole extending normally through the thickness thereof, a plurality of metal dowels, each of said dowels disposed in one of said holes so as to completely fill said hole, metal cladding completely surrounding said plurality of slabs, the portion of said metal cladding facing said fuel slabs being provided with a metallurgical bond restricted to each of said dowels at each end thereof.

2. A nuclear fuel plate comprising a plurality of contiguous coplanar $UO_2$ ceramic fuel slabs having a thickness equal to a major fraction of the thickness of said fuel plate, said plurality of fuel slabs being distributed throughout the area of the fuel plate, each of said slabs having means defining a hole extending normally through the thickness thereof, a plurality of metal dowels, each of said dowels disposed in one of said holes so as to completely fill said hole, metal cladding completely surrounding said plurality of slabs, the portion of said metal cladding facing said fuel slabs being provided with a metallurgical bond restricted to each of said dowels at each end thereof.

3. A nuclear fuel plate comprising a plurality of contiguous regular polygonal coplanar $UO_2$ ceramic fuel slabs having a thickness equal to a major fraction of the thickness of said fuel plate, said plurality of fuel slabs being distributed throughout the area of the fuel plate, each of said slabs having means defining a hole extending normally through the thickness thereof, a plurality of metal dowels, each of said dowels disposed in one of said holes so as to completely fill said hole, metal cladding completely surrounding said plurality of slabs, the portion of said metal cladding facing said fuel slabs being provided with a metallurgical bond restricted to each of said dowels at each end thereof.

4. A nuclear fuel plate comprising a plurality of contiguous coplanar square $UO_2$ ceramic fuel slabs having a thickness equal to a major fraction of the thickness of said fuel plate, said plurality of fuel slabs being distributed throughout the area of the fuel plate, each of said slabs having means defining a hole extending normally through the thickness thereof, a plurality of metal dowels, each of said dowels disposed in one of said holes so as to completely fill said hole, metal cladding completely surrounding said plurality of slabs, the portion of said metal cladding facing said fuel slabs being provided with a metallurgical bond restricted to each of said dowels at each end thereof.

5. A nuclear fuel plate comprising a ceramic fuel slab having a thickness equal to a major fraction of the thickness of said fuel plate, said slab being distributed throughout the area of the fuel plate and having means defining at least one hole extending normally through the thickness thereof, a metal dowel disposed in said hole so as to substantially fill said hole, metal cladding completely surrounding said slab, the portion of said metal cladding facing said fuel slab being provided with a metallurgical bond restricted to said dowel at each end thereof.

References Cited by the Examiner

UNITED STATES PATENTS

| | | | |
|---|---|---|---|
| 2,813,073 | 11/57 | Suller | 176—70 |
| 2,872,388 | 2/59 | Fahnoe | 176—82 |
| 2,934,482 | 4/60 | Brooks | 176—69 |
| 3,004,906 | 10/61 | Binstock | 176—82 |
| 3,093,566 | 6/63 | Currier et al. | 176—68 |

OTHER REFERENCES

AEC Document TID-7559 (part 1), August 1, 1959, pp. 133–153.

CARL D. QUARFORTH, *Primary Examiner.*

LEON D. ROSDOL, ROGER L. CAMPBELL, REUBEN EPSTEIN, *Examiners.*